(12) United States Patent
Bonissone et al.

(10) Patent No.: US 9,904,540 B2
(45) Date of Patent: Feb. 27, 2018

(54) METHOD AND SYSTEM TO AUTOMATE THE MAINTENANCE OF DATA-DRIVEN ANALYTIC MODELS

(71) Applicant: General Electric Company, Schenectady, NY (US)

(72) Inventors: Piero Patrone Bonissone, San Diego, CA (US); Naresh Sundaram Iyer, Ballston Spa, NY (US); Feng Xue, Clifton Park, NY (US); Johan Michael Reimann, Clifton Park, NY (US); Paul Ardis, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 14/297,297

(22) Filed: Jun. 5, 2014

(65) Prior Publication Data
US 2015/0355901 A1    Dec. 10, 2015

(51) Int. Cl.
*G06F 9/44*    (2006.01)

(52) U.S. Cl.
CPC ............... *G06F 8/70* (2013.01); *G06F 8/355* (2013.01)

(58) Field of Classification Search
CPC ....................................................... G06F 9/44
USPC ................ 717/101, 104, 120, 121, 122, 123
See application file for complete search history.

(56) References Cited

U.S. PATENT DOCUMENTS

| | | | |
|---|---|---|---|
| 5,598,076 A * | 1/1997 | Neubauer | B25J 9/161 318/568.13 |
| 6,023,579 A * | 2/2000 | Hellgren | G06F 9/465 717/100 |
| 6,615,220 B1 * | 9/2003 | Austin | G06F 17/30569 |
| 6,778,870 B1 * | 8/2004 | Li | G06F 17/50 700/115 |
| 6,915,252 B1 * | 7/2005 | Li | G06F 17/50 703/1 |
| 6,924,832 B1 * | 8/2005 | Shiffer | H04N 7/18 348/36 |
| 7,490,073 B1 * | 2/2009 | Qureshi | G06N 5/048 706/50 |
| 7,536,277 B2 | 5/2009 | Pattipatti et al. | |
| 7,539,597 B2 | 5/2009 | Wegerich et al. | |
| 7,562,058 B2 | 7/2009 | Pinto et al. | |
| 8,001,527 B1 * | 8/2011 | Qureshi | G06N 5/048 717/100 |

(Continued)

OTHER PUBLICATIONS

Sikorska ("Prognostic modelling options for remaining useful life estimation by industry"), Dec. 2010.*

*Primary Examiner* — Jae Jeon
(74) *Attorney, Agent, or Firm* — GE Global Patent Operation

(57) ABSTRACT

A method, system, and non-transitory computer-readable medium, the method including determining automatically, by a processor, whether behavior for a model representing a plurality of entities and relationships therebetween deviates from a reference behavior for the model; determining, in response to the determination that the model does deviate from the reference behavior, at least one basis for the deviation; automatically forecasting an estimate of a remaining useful life for the model; and modifying the model to compensate for the deviation by at least one of modifying the model to accommodate the deviation and updating the model based on at least one new requirement.

9 Claims, 5 Drawing Sheets

(56) References Cited

U.S. PATENT DOCUMENTS

| | | | |
|---|---|---|---|
| 8,050,874 B2 * | 11/2011 | Papadimitriou | G01N 27/9046 |
| | | | 702/34 |
| 8,103,463 B2 | 1/2012 | Kalgren et al. | |
| 8,335,601 B2 | 12/2012 | Sham et al. | |
| 8,769,484 B2 * | 7/2014 | Arsanjani | G06Q 10/06 |
| | | | 717/104 |
| 9,046,854 B2 * | 6/2015 | Yang | G03G 15/556 |
| 2004/0176887 A1 | 9/2004 | Kent et al. | |
| 2007/0126430 A1 * | 6/2007 | Kim | G01R 31/2858 |
| | | | 324/537 |
| 2010/0042287 A1 | 2/2010 | Zhang et al. | |
| 2010/0161295 A1 * | 6/2010 | Heil | G09B 9/301 |
| | | | 703/6 |
| 2011/0004499 A1 * | 1/2011 | Zhang | G06F 8/10 |
| | | | 705/7.37 |
| 2011/0004564 A1 * | 1/2011 | Rolia | G06Q 10/06 |
| | | | 705/348 |
| 2012/0101776 A1 | 4/2012 | Brower et al. | |
| 2012/0327383 A1 * | 12/2012 | Cao | G03F 7/70133 |
| | | | 355/67 |
| 2013/0268241 A1 | 10/2013 | Das et al. | |
| 2014/0007040 A1 * | 1/2014 | Zhong | G06F 8/00 |
| | | | 717/104 |
| 2015/0199197 A1 * | 7/2015 | Maes | G06F 8/71 |
| | | | 717/122 |
| 2015/0242623 A1 * | 8/2015 | Lindo | G06F 21/554 |
| | | | 726/23 |

\* cited by examiner

METHOD AND SYSTEM TO AUTOMATE THE MAINTENANCE OF DATA-DRIVEN ANALYTIC MODELS

BACKGROUND

Model obsolescence is a major impediment to the success of the deployment of analytic models and this is particularly the case for mission-critical applications. The rate of obsolescence might vary depending on the application and the dynamics involved. Usually, model performance may deteriorate drastically within a year from the initial deployment thereof, if model maintenance is not applied. This may also create a lack of confidence in the aging models. In large part, the existing approach to model maintenance is a manual process. This prevents achieving scalability in the size of the data, number of models, and maintaining consistent model performance.

SUMMARY

In some embodiments, a method includes determining automatically, by a processor, whether behavior for a model representing a plurality of entities and relationships therebetween deviates from a reference behavior for the model; determining, in response to the determination that the model does deviate from the reference behavior, at least one basis for the deviation; automatically forecasting an estimate of a remaining useful life for the model; and modifying the model to compensate for the deviation by at least one of modifying the model to accommodate the deviation and updating the model based on at least one new requirement.

In some embodiments, a non-transitory computer-readable medium includes instructions to automatically determine whether behavior for a model representing a plurality of entities and relationships therebetween deviates from a reference behavior for the model; instructions to determine, in response to the determination that the model does deviate from the reference behavior, at least one basis for the deviation; instructions to automatically forecast an estimate of a remaining useful life for the model; and instructions to modify the model to compensate for the deviation by at least one of modifying the model to accommodate the deviation and updating the model based on at least one new requirement.

In some embodiments, a system includes a storage device; a processor in communication with the storage device and operable to: automatically determine whether behavior for a model representing a plurality of entities and relationships therebetween deviates from a reference behavior for the model; determine, in response to the determination that the model does deviate from the reference behavior, at least one basis for the deviation; automatically forecast an estimate of a remaining useful life for the model; and modify the model to compensate for the deviation by at least one of modifying the model to accommodate the deviation and updating the model based on at least one new requirement.

DESCRIPTION

Some embodiments herein relate to a method and system for providing a meta-model to perform Prognostics and Health Management (PHM) of data-driven models. As used herein, a meta-model characterizes and refers to the algorithmic performance of a process. In some aspects, a meta-model is an abstraction that defines and describes the properties of a model, where the model is an abstraction of a real world phenomenon. In some embodiments, a meta-model herein may be used to characterize and define a process for performing PHM for a model.

Figure 1:
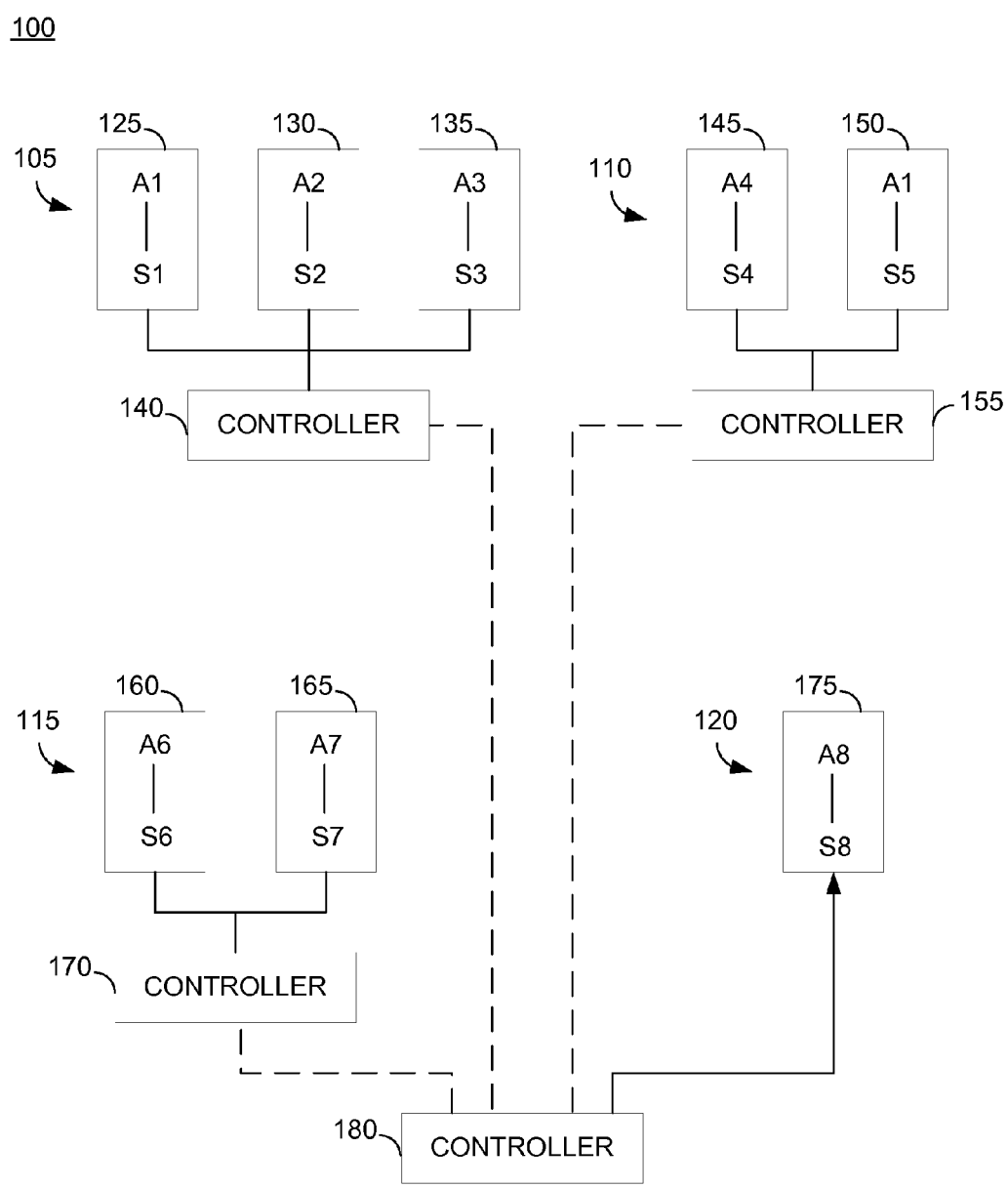
FIG. 1 is an illustrative environment being modeled, according to some embodiments.

FIG. 1 is an illustrative depiction of an environment 100, according to some embodiments herein. Environment 100 may generally represent a real world environment including one or more systems, for which a model may be generated to, for example, explain the systems' past and current behavior and to forecast a future behavior of the system(s). Environment 100 includes a plurality of agents (A) that have a set of sensors (S) associated therewith, where the sensor sets operate in conjunction with their associated agent(s) to capture observable data being monitored by the sensor sets. In some aspects, the agents may be machines, robots, processors, and other devices and systems.

Referring to FIG. 1, a number of (sub-)systems are shown, including systems 105, 110, 115, and 120. FIG. 1 is an illustrative environment, and in some embodiments the environment may include more, fewer, and alternative systems to those shown. System 105 includes agent—sensor set pairs 125, 130, and 135; system 110 includes agent—sensor set pairs 145 and 150; system 115 includes agent—sensor set pairs 160 and 165; and system 120 includes agent—sensor set pair 175. System 105 communicates its sensed data to controller 140; system 110 communicates its sensed data to controller 155; system 115 communicates its sensed data to controller 170; and system 120 communicates its sensed data to controller 180. The controllers may operate to receive, store, and at least in part, process the data associated with the systems of environment 100. Controller 180 may, in some embodiments, provide some level of control over the other controllers connected thereto.

The data received, stored, and possibly processed in environment 100 may be used to, in some aspects, to train a model during a training time of a model generation process. The data may also be used in some embodiments herein during a model lifestyle management process including PHM to, for example, provide diagnostics and prognostics of the health and operation of the model.

Figure 2:
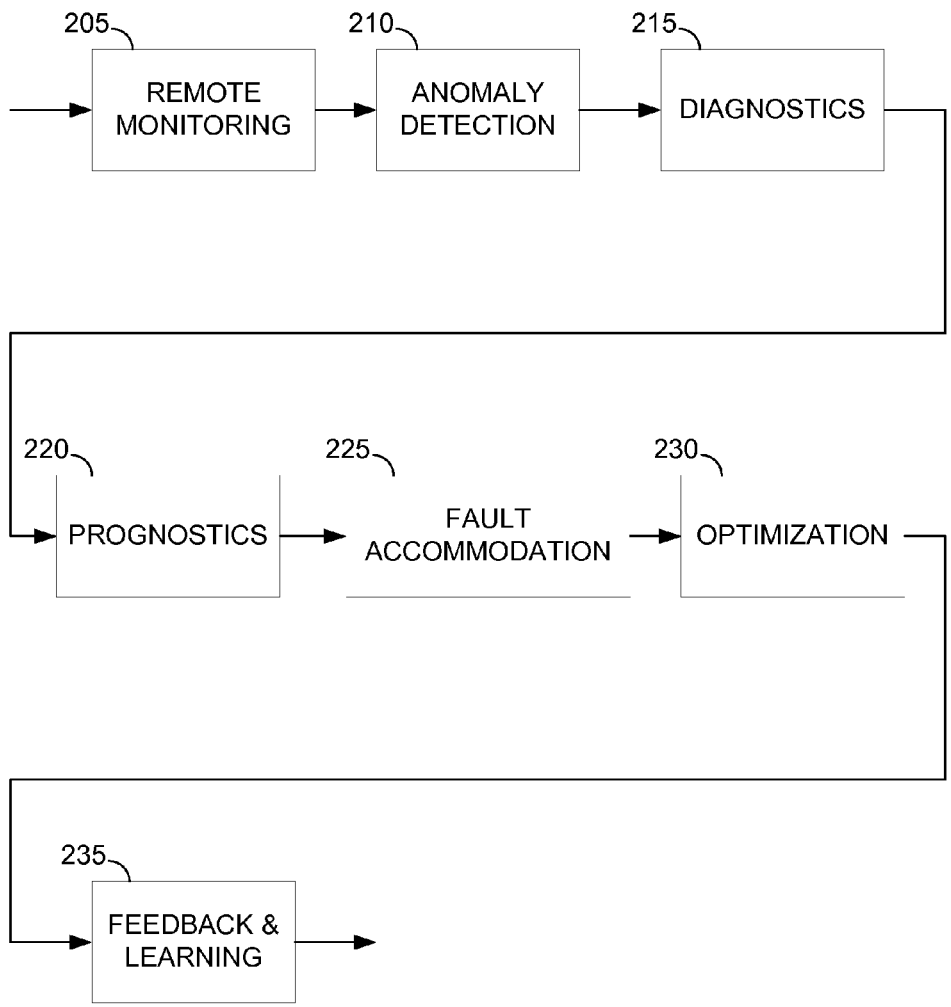
FIG. 2 is an illustrative flow, according to some embodiments.

FIG. 2 is an overview of a model maintenance workflow 200, in accordance with some embodiments herein. Workflow 200 may be a logical representation of a workflow including a number of operations. While the operations of workflow 200 are illustrated as being discrete and separate operations, one or more of the functions of the operations therein may be combined with each other. That is, in some regards and embodiments, functions associated with one or more of the operations of workflow 200 may be performed by more than one of the depicted components. In some embodiments, a performance of the operations of workflow 200 may primarily occur in a linear manner. In some embodiments, given the logical representation of FIG. 2, the operations therein may occur in a non-linear fashion. For example, one or more of the operations shown may be performed in parallel, at least in part. In some embodiments, workflow 200 may be embodied in an iterative process that may include repeating at least some operations more than once before concluding process 200, including in some instances feedback loop(s) between operations.

In some embodiments, workflow 200 may receive data from a deployed model that corresponds to a particular real world environment (e.g., FIG. 1, 100). The data may relate to any type of model. In some aspects, the data may be pre-processed to a format compatible with workflow 200. In some embodiments, workflow 200 may include processing the received data to ensure it is formatted/configured appropriately to be further processed thereby. The arrow leading into the workflow pipeline of FIG. 2 is meant to intimate the reception of data, although the data itself is not shown.

In some embodiments, remote monitoring (RM) component 205 operates to collect and update model performance metadata associated with the subject model being managed by the workflow. The metadata may include, for example, inputs, outputs, ground truth, errors, costs, and other monitored parameters. Metadata defines the feature space to characterize the model definition, design assumptions, training history, and past performance of the model. In some aspects, the metadata may include or relate to model applicability, a model's local performance, a training time window, design assumptions, (e.g., linearity, stationarity, etc.), features for maintainability, and the like. Aspects of RM may include collecting the metadata where the metadata concerns model prediction, training data, and testing data; and extracting statistical features that summarize the metadata. The metadata may be related to a number of topics, without limit, in accordance with some aspects herein.

Workflow component 210 includes Anomaly Detection (AD), in accordance with some embodiments herein. AD receives the extracted features that summarize information about the modeling data. AD 210 may link the extracted features of the metadata to patterns of model deviation. In some embodiments herein, a deviation may be indicated by a departure or difference between set, predetermined, or established value(s) or norm(s) for the extracted features. In some embodiments, a deviation may be expressed in the form of upper and lower limits, threshold ranges, a percentage change or difference from a set number, and other mechanisms for tracking metrics of the extracted features. The link(s) may be expressed as a statistical relationship between the extracted features and the model deviation. In particular, AD component 210 may operate to detect significant deviations of the model's behavior from a normalcy baseline (e.g., testing statistics) and characterize an associated input space.

In some embodiments herein, the specific AD techniques may be varied, as determined to be applicable to a specific model. However, it is noted that detection of an anomaly including a meta-model herein may be based on more than an accuracy of one or more threshold values. In some aspects, a "Pareto" dominance filter in a multi-objective evaluation space may be used.

In some aspects, AD 210 considers a true observation and an estimate model. The estimate model operates to track or mimic the true observation. In some regards, a validation of the model may be performed based on some ground truth. In this manner, the functional relationship between a vector of featured values and a vector corresponding to model deviation for the validation data.

Workflow 200 includes diagnostics (D) component 215, in accordance with some embodiments herein. In some embodiments, the detection of significant deviations from a normalcy baseline by AD 210 may be used by D 215 to identify model failure mode(s) (Dx) and identify change requirements (Rx). In some instances, D 215 may recognize patterns in the relationships between the extracted features and the model deviation from AD 210 across models and over time. That is, D 215 may provide a characterization of the entire feature space of all possible feature values as they relate to final model failure mode(s), where the characterization may include a temporal component (i.e., a characterization based on features and time). In some aspects, D 215 may inform a user (e.g., machine, service, person, etc.) whether the subject model should be replaced (i.e., unreliable, inaccurate, etc.). This "monitoring" aspect of D 215 may occur continuously or less frequently based on a schedule, on request, or based on other factors.

In some embodiments, a model may exhibit a deviation in one or a combination of different ways. Some failure modes, the impact or case of the failure modes, and change requirements for model retraining as a result of the failure modes is listed in the following Table 1.

TABLE 1

| Failure Mode | Impact/Causes | Change Requirements for Model Retraining |
|---|---|---|
| Extrapolation in input space | Operating model outside its training manifold | Add new points (& associated ground truth) to training set |
| Small relevant training set with respect to query | Operating model in region with sparse training points | Add new points (& associated ground truth) to training set |
| Data drift (ramp, mean shift) | Multiple causes (model failure or phys. system failure?) | Conditioned to model failure; retrain model on recent data set capturing change [May use prior training set as well] |
| Parametric (evolutionary) change | Physical system is slowly changing (e.g., deterioration) | Retrain model on recent data set capturing impact of change |
| Structural (drastic) change | Physical system is not in original normal mode. Training set did not capture current system mode | Retrain model on data set representing new operating mode |
| Time obsolescence | Training set is too old - did not capture current behavior | Retrain model on more recent data set |
| Seasonality | Training set was too short- did not capture current behavior | Retrain model on more recent data set Account for seasonality in model structure |

Table 1 is a tabular listing of a few examples of different failure modes. Table 1 is not meant to be nor is it an exhaustive listing of failure modes within the scope of the present disclosure.

Workflow 200 may include a prognostics (P) component 220, according to some embodiments herein. In one example P component 220 may operate to provide a prediction or forecast a model's remaining useful life (RUL). Other measures of a forecast on performance may be used, in accordance with some embodiments herein. The forecast provided by P component 220 may indicate an expected deviation based on various factor(s). The forecast may be an expected deviation over time, an expected deviation with alternate set of inputs, and can vary without limit herein. Examples of a methodology to provide a forecast or prediction for the model may include (1) creating a case base reasoning (CBR) for model prognostics where a case base (CB) is created from previous instances and CBR is used for predictions and (2) stressing the subject model(s) during a validation of the model(s) to identify pre-cursors for model deterioration.

Workflow 200 may include a fault accommodation (FA) component 225, according to some embodiments herein. FA 225 in one example operates to provide a mechanism to continue to use the model even though it is known that the operation, health, or accuracy of the model has degraded. FA 225 may provide a level of assurance that the model is able to fulfill its intended functionality and performance, at least to an acceptable extent. FA herein may encompass tuning the rules related to the model, applying (minor) updates (quickly) to the model as "patches", and reducing the model's applicability in an effort to reduce future estimated deviation for the model. FA 225 may provide a mechanism for using the model even where functionality/performance of the model is limited, as least in part. Operation of the model in a reduced yet still effective "limp mode" may, in some embodiments, facilitate continued operation of the model until, for example, a replacement model may be generated and implemented.

Operation of a model may be continuously evaluated with respect to FA 225. In some embodiments, maintenance of a model may be scheduled to occur before the model becomes completely ineffectual. Fault accommodation herein may be used in some instances to support operation of a model until a scheduled maintenance replacement or re-tuning of the model.

In some embodiments, FA 225 may include, in a case of a model ensemble (i.e., multiple models) and dynamic fusion (i.e., balance the impact of the different models), updating metadata and using dynamic fusion to determine changes in model applicability and relevance weight for different regions of the model's feature space. FA 225 can include, in a case of a model ensemble and static fusion (i.e., limit the models to a specific sub-set of applicability), degrading model applicability and relevance weight globally or for different regions of the feature space. In a case of a single model with a confidence estimate, FA 225 may operate to degrade the model's credibility. In the case of a single model and a drastic failure, FA 225 may include removing the model and using default values/function, while forcing model retraining.

Workflow 200 may further include an optimization (O) component 230. O component 230 may operate to update a model based on new requirements, where the updated model is designed with the modifications considered by FA component 225. Further modification may be used in updating the model in some embodiments. In some embodiments, the same process used to generate the model in a first or initial design time may be used by O component 230 using the new requirements.

In some embodiments, optimization herein may include an offline rebuilding of a model, including new requirements for consideration of the model that may not have been considered during an initial design of the model. Embodiments herein are data-driven, as such the data in the form of factors and inputs (i.e., the new requirements) are used in making generating the updated or revised model. In some embodiments, a safeguard or other limiting mechanism may be used in conjunction with optimization and other operations of workflow 200 to ensure that only changes determined to sufficient and/or significant enough are implemented. In some instances, a validation of proposed changes is made using, for example, a closed loop optimization process. Operations of workflow 200 may be automated, including operations 210-230.

In some embodiments, a feedback and learning operation 235 may be included in workflow 200. The feedback component may operate to update the subject model's history and the model's case base (CB). Feedback component 235 may learn from the automated diagnostics, prognostics, and optimization aspects herein to inform the development and generation of other models. Feedback component 235 may capture all outcomes from a model PHM process (e.g., process 200) and create a case base for a model lifecycle. In some instances, after populating the CB, case-based reasoning (CBR) can be used for customized analysis estimates, including for example anomaly detection, diagnostics, and prognostics.

Figure 3:
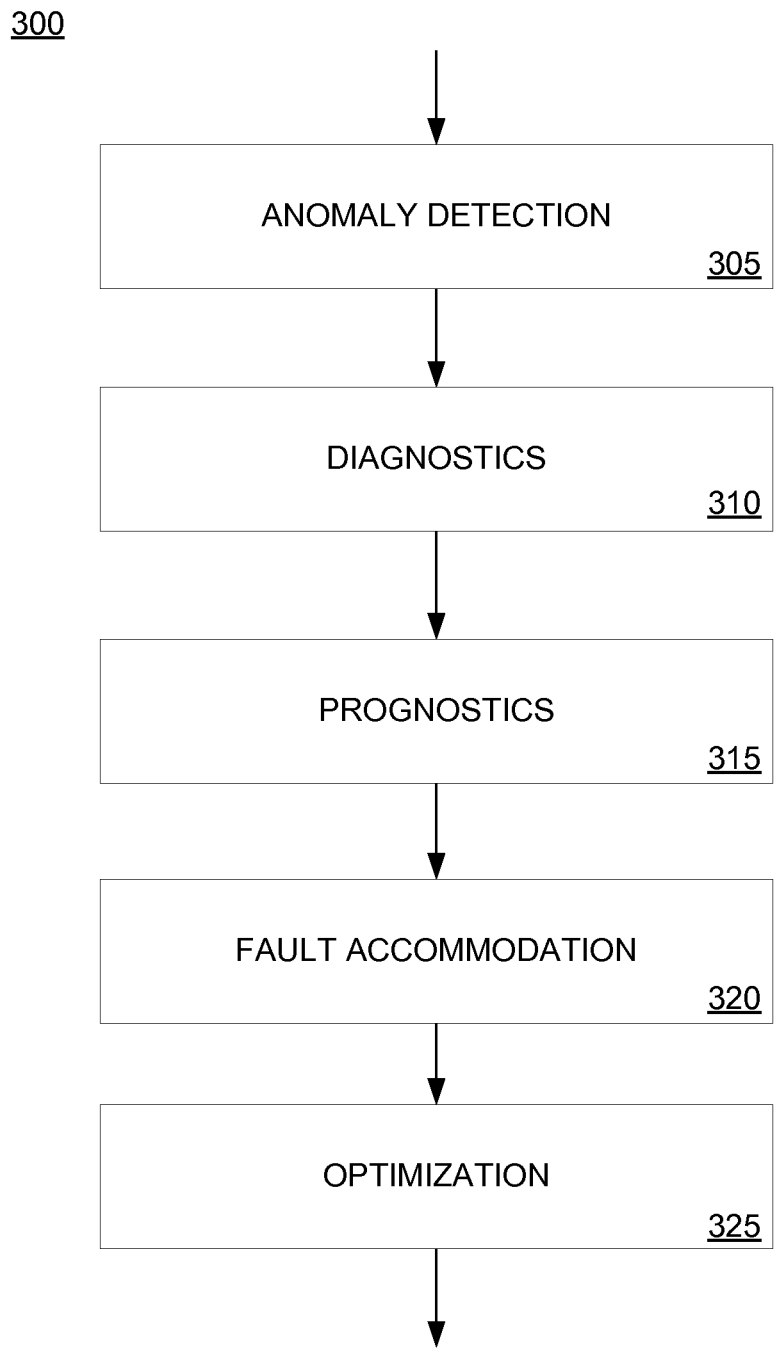
FIG. 3 is an illustrative flow diagram of a process, according to some embodiments.

FIG. 3 includes a flow diagram 300 of process, in some embodiments herein. Process 300 may be a part of another (not shown) process, workflow, or execution. The arrows pointing into operation 305 and leaving operation 325 further demonstrate this point. Process 300 includes an anomaly operation 305 to detect and identify deviation from an expected performance. Process 300 also includes a diagnostics operation 310, a prognostics operation 315, a fault accommodation operation 320, and an optimization operation 325. Each of these operations may operate in a manner similar to the discussion of similarly named operations disclosed in FIG. 2. Accordingly, a detailed description of these same features is not repeated here. In some aspects, the combination of the operations disclosed in FIG. 2 cooperate to provide automated, efficient lifecycle management of a model representing a real world phenomenon (e.g., a performance of a business process, an operation of device, system, or apparatus, etc.) In accordance with concepts disclosed herein, process 300 may provide a mechanism to identify and detect deviations before they impact operations in a real world situation/context being modeled.

Figure 4:
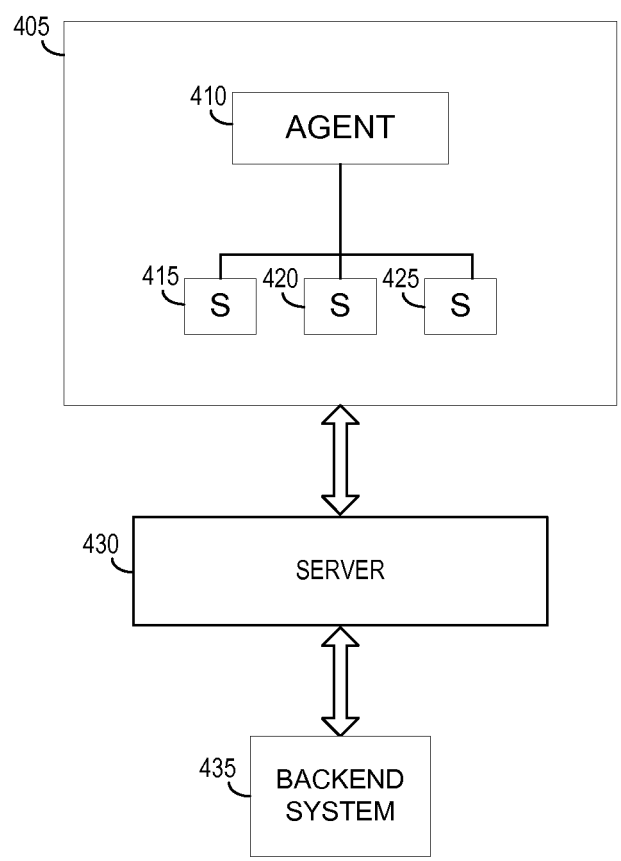
FIG. 4 is a block diagram of a system, according to some embodiments.

FIG. 4 is an illustrative block diagram of a system that may support embodiments disclosed herein, including the processes PHM for data-driven models. System 400 is an example of a system to support the processes disclosed herein. Applicable systems may have alternative components and being arranged in different configurations. All such systems are considered within the scope of the present disclosure. System 400 includes an environment 405 where one or more parameters are monitored by the combination of agent(s) 410 and a sensor set including sensors 415, 420, and 425. Data related to environment 405 and obtained by the agent(s) and sensors may be communicated to server 430. Server 430 may operated to receive the data and further transmit the data to a backend system 435. In some embodiments, server 430 may (pre-)process the received data and manipulate it to place it in a configuration that may be accepted by the backend system and processed thereby.

Server 430 and backend system 435 may include processors and memory and/or storage units to process and store the data, and communication interfaces (not shown) for communicating with each other. One or the other or a combination of server 430 and backend system 435 may provide a mechanism for implementing the processes disclosed herein.

Figure 5:
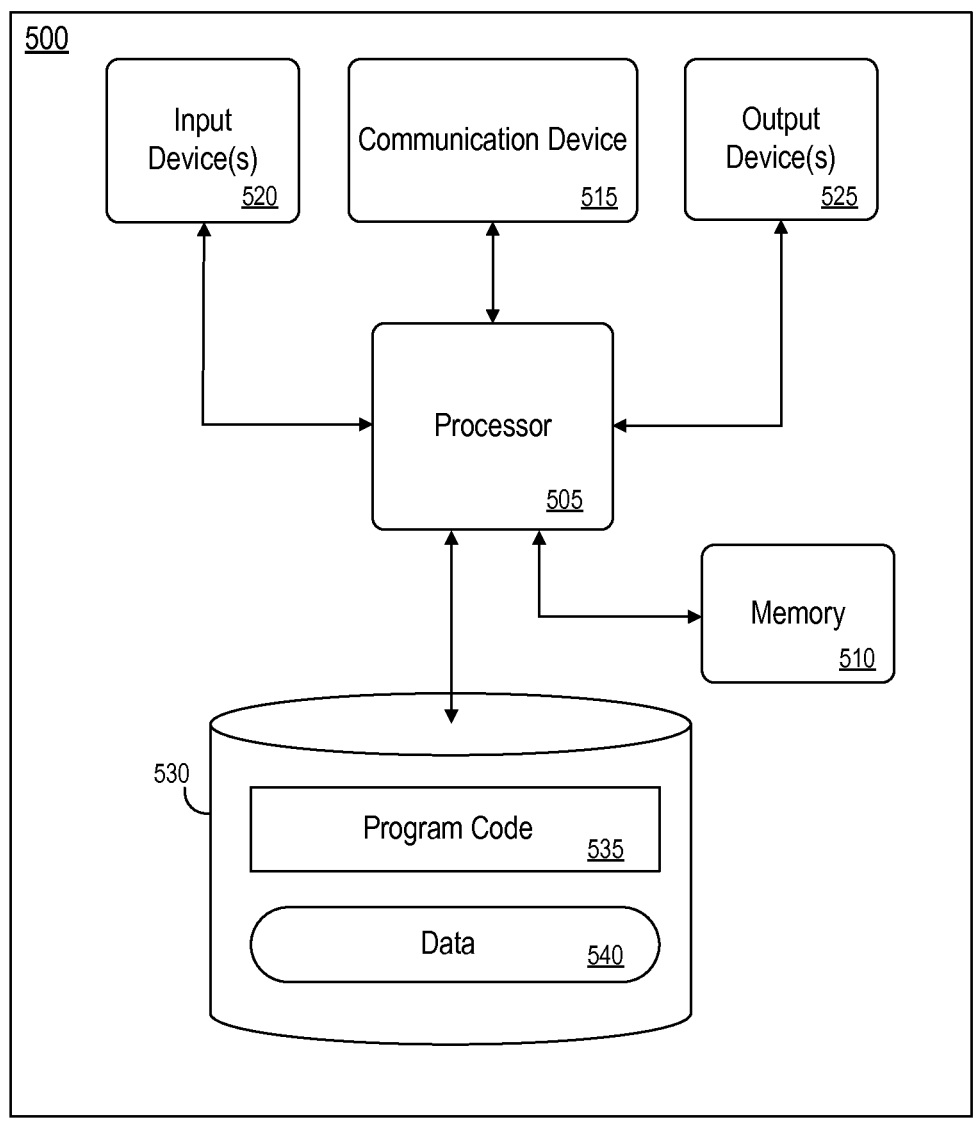
FIG. 5 is a depiction of an apparatus, in accordance with some embodiments herein.

FIG. 5 is a block diagram overview of a system or apparatus 500 according to some embodiments. System 500 may be, for example, representative of any of the devices described herein, including for example a controller (e.g., FIG. 1, controllers 140, 155, 180) a server (FIG. 4, server 430), and backend system 435, in accordance with aspects disclosed herein. System 500 comprises a processor 505, such as one or more commercially available Central Processing Units (CPUs) in the form of one-chip microprocessors or a multi-core processor, coupled to a communication device 515 configured to communicate via a communication network (not shown in FIG. 5) to another device or system (e.g., an agent device and one or more sensor sets). In the instance system 500 comprises a server (e.g., supporting the functions and services provided by a controller or a backend system), communication device 515 may provide a mechanism for system 500 to interface with another device, system, or service (e.g., server 430 by a backend system). System 500 may also include a local memory 510, such as RAM memory modules. The system further includes an input device 520 (e.g., a touchscreen, mouse and/or keyboard to enter content) and an output device 525 (e.g., a touchscreen, a computer monitor to display, a LCD display).

Processor 505 communicates with a storage device 530. Storage device 530 may comprise any appropriate information storage device, including combinations of magnetic storage devices (e.g., a hard disk drive), optical storage devices, solid state drives, and/or semiconductor memory devices. In some embodiments, storage device 530 may comprise a database system.

Storage device 530 may store program code or instructions 535 that may provide computer executable instructions for managing a lifecycle of a model, in accordance with processes herein. Processor 505 may perform the instructions of the program instructions 535 to thereby operate in accordance with any of the embodiments described herein. Program code 535 may be stored in a compressed, uncompiled and/or encrypted format. Program code 535 may furthermore include other program elements, such as an operating system, a database management system, and/or device drivers used by the processor 505 to interface with, for example, peripheral devices. Storage device 530 may also include data 540 such as stored models. Data 540 may be used by system 500, in some aspects, in performing one or more of the processes herein, including individual processes, individual operations of those processes, and combinations of the individual processes and the individual process operations.

All systems and processes discussed herein may be embodied in program instructions stored on one or more non-transitory computer-readable, processor-executable media. Such media may include, for example, a solid state drive, a floppy disk, a CD-ROM, a DVD-ROM, magnetic tape, and solid state Random Access Memory (RAM) or Read Only Memory (ROM) storage units. According to some embodiments, a memory storage unit may be associated with access patterns and may be independent from the device (e.g., magnetic, optoelectronic, semiconductor/solid-state, etc.) Moreover, in-memory technologies may be used such that databases, etc. may be completely operated in RAM memory at a processor. Embodiments are therefore not limited to any specific combination of hardware and software.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer-implemented method to control a maintenance of a model on a software platform executing the model, the method comprising:
automatically determining, by a processor, that a behavior of a model executing on a software platform and representing a plurality of entities and relationships between the plurality of entities deviates from a reference behavior for the model, the behavior of the model being represented as metadata that describes properties of the model and the determining including:
extracting features from the metadata; and
determining at least one statistical relationship between the extracted features of the metadata and a deviation of the model from a norm for the extracted features;
determining a pattern in the at least one statistical relationship between the extracted features of the metadata and the deviation of the model from a predetermined norm for the extracted features;
automatically determining, by the processor in response to the determined pattern in the at least one statistical relationship, at least one model failure mode for the model;
automatically forecasting, by the processor, a future deviation of the model based on the determined model deviation and in terms of an estimate of a remaining useful life for the model;
modifying, by the processor, the model to compensate for the determined model deviation by operating the model to accommodate the determined model deviation and to reduce a future estimated deviation for the model; and
updating, by the processor, the model based on at least one new requirement, the at least one new requirement being based at least on the modifications to accommodate the determined model deviation.

2. The method of claim 1, further comprising receiving the metadata from a deployed instance of the model.

3. The method of claim 1, further comprising capturing outcomes of the method and updating a model history to include the outcomes.

4. A non-transitory computer-readable medium having executable instructions stored thereon to control a maintenance of a model on a software platform executing the model, the medium comprising:
instructions to automatically determine whether behavior for a model representing a plurality of entities and relationships between the plurality of entities deviates from a reference behavior for the model, the behavior of the model being represented as metadata that describes properties of the model and the determining including:
extracting features from the metadata; and
determining at least one statistical relationship between the extracted features of the metadata and a deviation of the model from a norm for the extracted features;
instructions to determine a pattern in the at least one statistical relationship between the extracted features of the metadata and the deviation of the model from the norm for the extracted features;
instructions to automatically determine, in response to the determined pattern in the at least one statistical relationship, at least one model failure mode for the model;
instructions to automatically forecast a feature deviation of the model based on the determined model deviation and in terms of an estimate of a remaining useful life for the model;
instructions to modify the model to compensate for the determined deviation by operating the model to accommodate the determined deviation and to reduce a future estimated deviation for the model; and
instructions to update the model based on at least one new requirement, the at least one new requirement being based at least on the modifications to accommodate the deviation.

5. The medium of claim 4, further comprising instructions to receive metadata from the deployed model.

6. The medium of claim 4, further comprising:
   instructions to capture outcomes of the method; and
   instructions to update a model history to include the outcomes.

7. A system comprising:
   a storage platform hosting a model;
   a meta-model to control a maintenance of the meta-model deployed on the software platform;
   a storage device; and
   a processor in communication with the storage device and operable to:
      automatically determine whether behavior for a model representing a plurality of entities and relationships between the plurality of entities deviates from a reference behavior for the model, the behavior of the model being represented as metadata that describes properties of the model and the determining including:
         extracting features from the metadata; and
         determine at least one statistical relationship between the extracted features of the metadata and a deviation of the model from a norm for the extracted features;
      determine a pattern in the at least one statistical relationship between the extracted features of the metadata and the deviation of the model from the norm for the extracted features;
      automatically determine, in response to the determined pattern in the at least one statistical relationship, at least one model failure mode for the model;
      automatically determine, in response to the determined pattern in the at least one statistical relationship, at least one model failure mode for the model;
      automatically forecast a future deviation of the model based on the determined model deviation and in terms of an estimate of a remaining useful life for the model;
      modify the model to compensate for the determined deviation by operating the model to accommodate the determined deviation and to reduce a future estimated deviation for the model; and
      update the model based on at least one new requirement, the at least one new requirement being based at least on the modifications to accommodate the deviation.

8. The system of claim 7, wherein the processor is further operable to receive metadata from the deployed model.

9. The system of claim 7, wherein the processor is further operable to:
   capture outcomes of the method; and
   update a model history to include the outcomes.

* * * * *